United States Patent [19]
Merz et al.

[11] Patent Number: 5,281,789
[45] Date of Patent: Jan. 25, 1994

[54] METHOD AND APPARATUS FOR DEPOSITING MOLTEN METAL

[76] Inventors: Robert Merz, 3337 Dawson St., Pittsburgh, Pa. 15213; Fritz B. Prinz, 5801 Northumberland St.; Lee E. Weiss, 6558 Darlington Rd., both of Pittsburgh, Pa. 15217

[21] Appl. No.: 919,194

[22] Filed: Jul. 24, 1992

[51] Int. Cl.⁵ .............................................. B23K 9/04
[52] U.S. Cl. ............................................... 219/76.15
[58] Field of Search ............ 219/76.15, 130.21, 137.43

[56] References Cited

U.S. PATENT DOCUMENTS

| | | | |
|---|---|---|---|
| 2,998,922 | 9/1961 | Gibson | 219/76.15 |
| 3,064,114 | 11/1962 | Cresswell et al. | 219/76.15 |
| 3,370,151 | 2/1968 | Normando | 219/130.21 |
| 4,019,011 | 4/1977 | Cape | 219/76.15 |
| 4,547,391 | 10/1985 | Jenkins | 219/76.15 |
| 4,775,092 | 10/1988 | Edmonds | 228/222 |
| 4,842,186 | 6/1989 | Doyle et al. | 228/222 |
| 4,894,505 | 1/1990 | Malone et al. | 219/76.1 |

FOREIGN PATENT DOCUMENTS

63-157767  6/1988  Japan .............................. 219/137.43

OTHER PUBLICATIONS

"A Rapid Tool Manufacturing System Based on Stereolithography and Thermal Spraying" by Lee E. Weiss, E. Levent Gursoz, F. B. Prinz, Paul S. Fussell, Swami Mahalingham and E. P. Patrick, published by the American Society of Mechanical Engineers, 1990, pp. 40–48.

"DC Arc Plasma-The Future in the P/M Industry?" by Douglas H. Harris, published by ASP-Materials, Inc., Dayton, Ohio.

Microwave Materials and Devices, J. K. Dillion, Jr., Chairman, "Polycrystalline Ferrite Films for Microwave Applications Deposited by Arc-Plasma" by D. H. Harris, J. R. Janowiecki, C. E. Semler, M. C. Willson and J. T. Cheng published in the Journal of Applied Physics, vol. 41, No. 2, Mar. 1, 1970.

*Primary Examiner*—Clifford C. Shaw
*Attorney, Agent, or Firm*—Buchanan Ingersoll

[57] ABSTRACT

A collector electrode and adjacent electric weld torch are placed at a selected distance from a work surface or substrate. An electric welding current is generated so that a welding current arc forms between the collector electrode and the weld torch. A feed metal is then fed into the welding current arc and is melted into molten metal adjacent to the collector electrode. The molten metal is then deposited onto a work surface. The collector electrode and weld torch are positioned so that the welding current arc between the weld torch and the collector electrodes does not penetrate the work surface or the already-deposited metal.

29 Claims, 6 Drawing Sheets

METHOD AND APPARATUS FOR DEPOSITING MOLTEN METAL

BACKGROUND OF THE INVENTION

1. Field of the Invention

The present invention relates generally to a method and apparatus for depositing molten metal on a substrate using an arc welder.

2. Description of the Prior Art

Objects of various shapes may be formed by the depositing of layers of material on a substrate. A preform is typically used in this process. A preform is a section of material upon and around which the material is deposited. The preform is machined so as to reflect the final shape of the built-up object. Often, the deposited material will bond to the preform. Thus, the use of a preform typically requires the additional steps in the manufacturing process of machining the preform and removing the preform after fabrication.

Other methods of building objects by material deposition have attempted to eliminate the use of a conventional preform. For example, U.S. Pat. No. 4,775,092 to Edmonds et al. provides a method and apparatus for building objects by welding without the use of a conventional preform. The technique of Edmonds, however, involves running a welding current from the consumable material feed to the just deposited material.

One type of material used in such material deposition processes are metals. A typical means of depositing metals in a manner that allows the deposited metal to be bonded to other metal layers is through welding. However, prior art welding techniques such as is shown in prior art FIG. 1 typically require a substrate made of a conductive material so that a welding current may be directed through the substrate. The arc caused by the welding current then melts feed metal placed adjacent the substrate. These prior art welding techniques can cause the just-deposited metal as well as the previously applied layers of metal and the substrate to be influenced by the welding arc. Such welding arc influences include substantial welding arc penetration into the already-deposited metal which results in the remelting of the already-deposited metal or substrate. When the deposited metal is substantially remelted, there is an accompanying loss in integrity of the shape of the deposited metal. If layers adjacent to the initial layers and substrate have different compositions, remelt could cause the dissimilar materials to mix. Thus, typical welding techniques are inappropriate for the fabrication of objects having accurate dimensions and shapes. Prior art welding methods also cannot weld onto a nonconductive or poorly conductive substrate.

SUMMARY OF THE INVENTION

We provide a method and apparatus for depositing molten metal with a dripping technique upon a work surface and subsequent layers placed thereon. The apparatus is comprised of a collector electrode placed at a selected distance from the work surface. A weld torch is also located at a selected distance from a collector electrode and proximate to the work surface. An electric welding current is generated so that a welding current arc forms between the collector electrode and the weld torch.

A feed metal is then fed into the welding current arc and is melted into molten metal adjacent to the collector electrode. The molten metal is then deposited onto the work surface and subsequent layers of metal deposited thereon. In a preferred embodiment metal droplets are formed in the electric arc between the collector electrode and the torch.

Preferably, the welding current arc between the weld torch and the collector electrodes does not penetrate the work surface or the already-deposited metal. This penetration is prevented by insulating the target and positioning the collector electrode and the weld torch at an adequate distance from the work surface and the deposited metal. Since the welding current arc travels between the weld torch and the collector electrode, the already-deposited metal is physically and electrically separated from the welding current arc.

The collector electrode preferably has a passage located within it. A coolant passes through this passage, thus cooling the collector electrode. The collector electrode is also preferably connected to a shaft that is mounted so as to be rotatable when driven by a motor. This rotation of the collector electrode prevents any one point of the collector electrode from being heated directly by the electric arc for a great length of time. Also, the collector electrode is preferably fabricated of copper or a copper alloy which, because of the high electrical and thermal conductivity of copper, allows the build-up of heat to be minimized.

Furthermore, the electrode and weld torch are preferably movable as a unit so that the molten metal may be deposited onto selected locations on the work surface. Alternatively, the work surface may be movable while the weld torch and collector electrode are either movable or held stationary so as to selectively position the deposited metal on the work surface. In an alternative embodiment, the collector electrode has beveled sides.

DESCRIPTION OF THE PREFERRED EMBODIMENT

Figure 1:
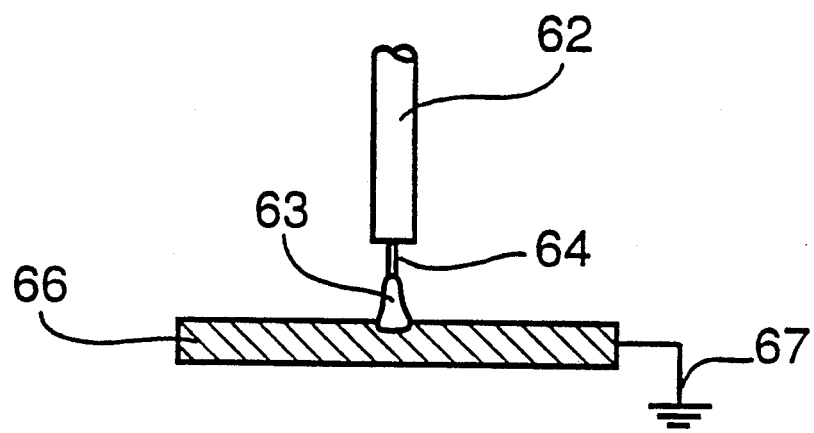
FIG. 1 is a front view of a prior art technique for depositing material by welding.

Referring first to prior art FIG. 1, a conventional technique for metal inert gas (MIG) welding is shown. A weld torch 62 has a supply of feed metal 64 extending from it. The weld torch 62 and feed metal 64 are located proximate to a work surface or substrate 66. The substrate 66 is made of an electrically conductive material. An electric current is generated from a power source (not shown). The electric current forms an arc 63 between the weld torch 62 and the substrate 66. The electric current arc 63 travels between the weld torch 62 and the substrate 66 so as to extend from feed metal 64. The electric current arc 63 melts the feed metal 64 into molten metal. After the feed metal 64 has been melted and deposited on the substrate, the electric current arc 63 continues to extend from the substrate 66 to the feed metal 64, penetrating the already-deposited metal. Thus, the electric current arc 63 can deform the already-deposited metal. The same problems occur with TIG welding techniques.

Referring next to FIGS. 2, 3, 5 and 6, two preferred methods and apparatus for depositing molten metal are shown. A work surface such as substrate 16 is provided. The apparatus 10 includes a collector electrode 12 positioned at a selected distance from the substrate 16. The substrate is made of any selected material and need not be electrically conductive. Furthermore, the substrate 16 may be made of a material similar or identical to the deposited metal. If a substrate material is chosen in which sufficient bonding may occur between the substrate 16 and the deposited material, the object may incorporate the substrate 16 in its structure. A weld torch 14 is also positioned at a selected distance from the collector electrode 12.

Figure 4:
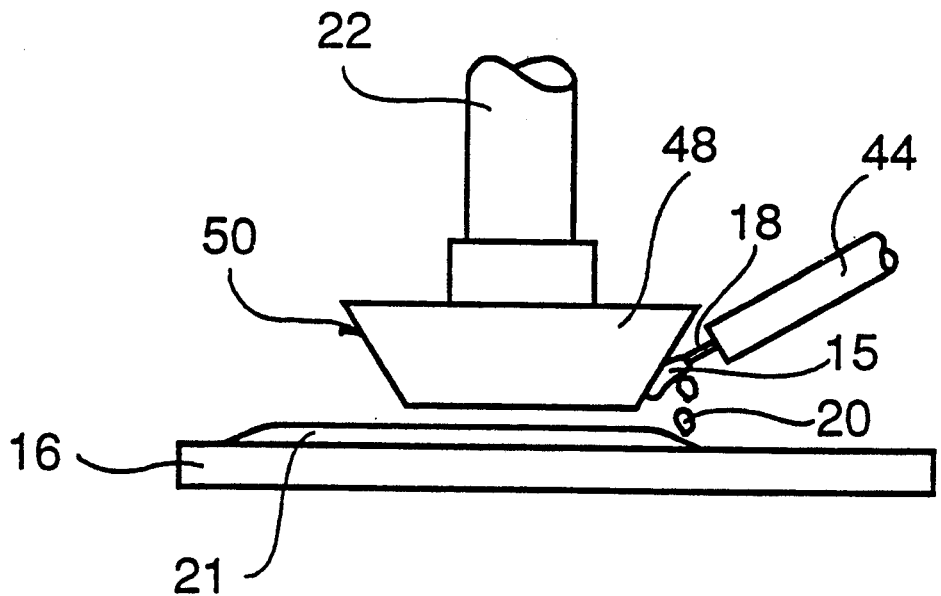
FIG. 4 is a side view of a portion of another embodiment of the apparatus for depositing molten metal.

The collector electrode 12 is preferably cylindrical in shape and is made of copper or a copper alloy. The collector electrode 12 preferably has smooth continuous sides 13. In the embodiments of FIGS. 2, 3, 5 and 6 these sides are approximately perpendicular to the substrate 16. They also may be beveled as shown in the embodiment of FIG. 4 or rounded. In the embodiment of FIG. 4, the collector electrode 48 has beveled sides 50. The welding current arc 15 will thus travel between the weld torch 14 and the beveled sides 50 of the collector electrode 12. Although the beveled sides 50 of collector electrode 48 are shown to be sloped downward and inward, the sides may be sloped downward and outward. Additionally, any angle of slope for the sides 50 may be selected. Copper is the preferred material of collector electrode 12 because of its high electrical conductivity. The collector electrode 12 is mounted on a rotating shaft 22. Thus, as shown by the curved arrow of FIGS. 3 and 7, the collector electrode 12 rotates as rotating shaft 22 rotates. The collector electrode and substrate also move relative to one another as indicated by the straight arrow.

Figure 6:
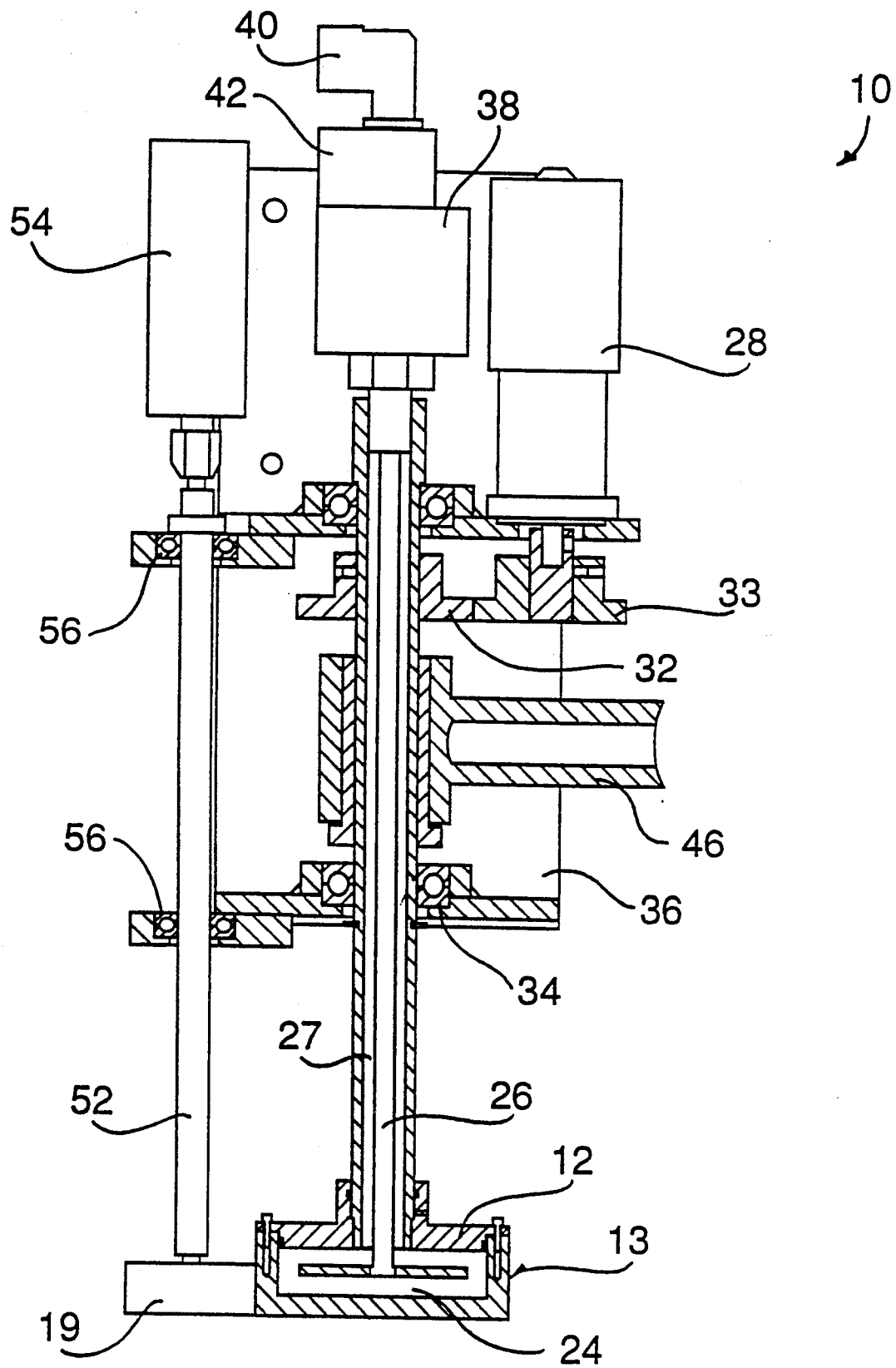
FIG. 6 is a front view partially in cross section of the preferred apparatus for depositing molten metal partially shown in FIG. 2.

Referring to FIG. 6, the collector electrode 12 has a coolant passage 24 located within it. Various coolant fluids are able to travel through the coolant passage 24. The coolant passage 24 is connected to an inner coolant channel 26 and an outer coolant channel 27. Both the inner coolant channel 26 and the outer coolant channel 27 are located within the rotating shaft 22. The inner coolant channel 26 and outer coolant channel 27 are preferably coaxial. Fluids are thus able to flow into coolant passage 24 from the inner coolant channel 26. Similarly, coolant fluids may flow out of the coolant passage 24 through outer coolant channel 27 or vice versa. A rotating water connection 38 is connected to a conductive shaft 22 at an end of rotating shaft 22 located distal to collector electrode 12. The coolant chamber 38 has an intake 40 through which coolant enters the apparatus 10. The intake 40 is connected to the inner coolant channel 26. Thus, coolant that enters intake 40 may travel through rotating shaft 22 within inner coolant channel 26. The coolant chamber 38 further has an exhaust 42 through which coolant exits the apparatus 10. The exhaust 42 is connected to an outer coolant channel 27. Thus, coolant that travels through rotating shaft 22 within the outer coolant channel 27 may exit the exhaust 42. A coolant pump (not shown) is then connected to the apparatus 10 at the intake 40 and the exhaust 42.

Figure 2:
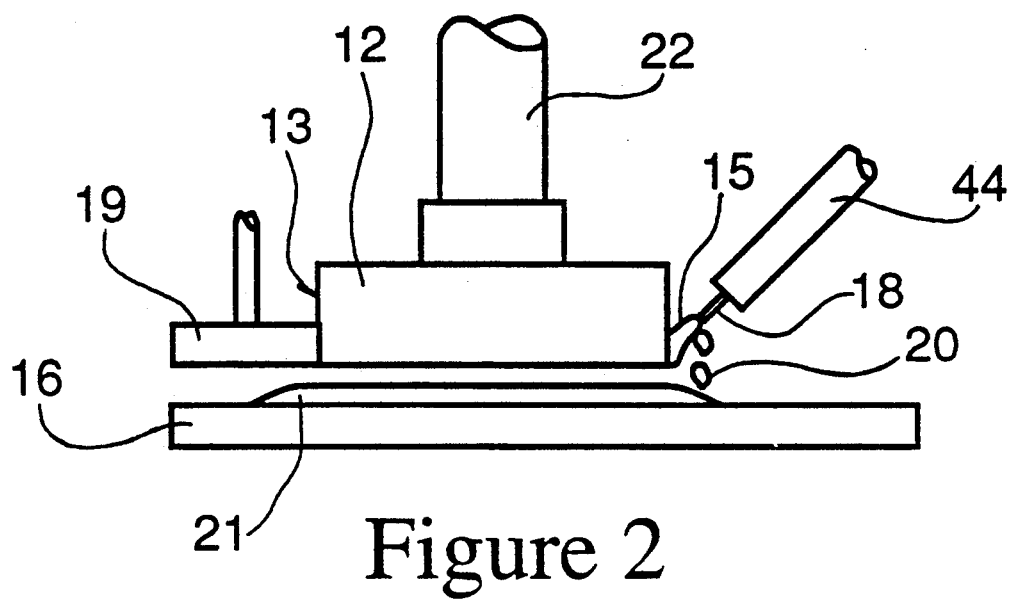
FIG. 2 is a side view of a portion of the preferred apparatus for depositing molten metal which utilizes a brush.

During operation of our device, we observed carbon build-up on the electrode 12. Therefore, we prefer to provide an optional rotating brush 19 to remove the carbon. As shown in FIGS. 2 and 6 we prefer to provide a wire brush 19 mounted at the end of a rotating shaft 52. The shaft 52 is rotatably mounted to a frame 36 with a set of bearings 56. The shaft is driven by a motor 54. Rotation of the shaft 52 causes the wire brush 19 to rotate. The brush 19 is in contact with the collector electrode 12 to remove carbon deposited on the electrode during welding. The collector electrode can be cleaned before, during and after operation by rotating both the electrode and the brush. The brush rotates at a high speed. To protect against particles flying away from the brush, the brush is shielded with a metal cover (not shown). One could also remove the carbon from the collector with a gas-torch that burns the carbon or could remove it chemically.

Single metal droplets sometimes stick to the collector electrode. They are also removed by the brush. Such droplets could be removed by a sharp edge, which is in contact with the collector electrode and shears off the sticking droplet while the electrode is rotating.

The rotating shaft 22 is rotatably attached to and extends within a frame 36. The rotating shaft 22 is rotatably mounted to frame 36 by a set of bearings 34. Within frame 36, the rotating shaft 22 has a shaft gear 32 mounted coaxial to the exterior of the rotating shaft 22 such that as the shaft gear 32 is rotated, the rotating shaft 22 is caused to rotate as well. Rotating shaft 22 is further provided with a rotary welding ground connection 46. The path of the welding current runs from collector electrode 12 thru shaft 22 to rotary ground connection 46.

As shown in FIG. 6, a motor gear 33 is mounted to a driven portion of a motor 28. Motor gear 33 is engaged with the shaft gear 32 so that as the motor gear 33 rotates, the shaft gear 32 is caused to rotate as well. The shaft gear 32 then rotates the shaft 22 which causes the collector electrode 12 to rotate.

Figure 7:
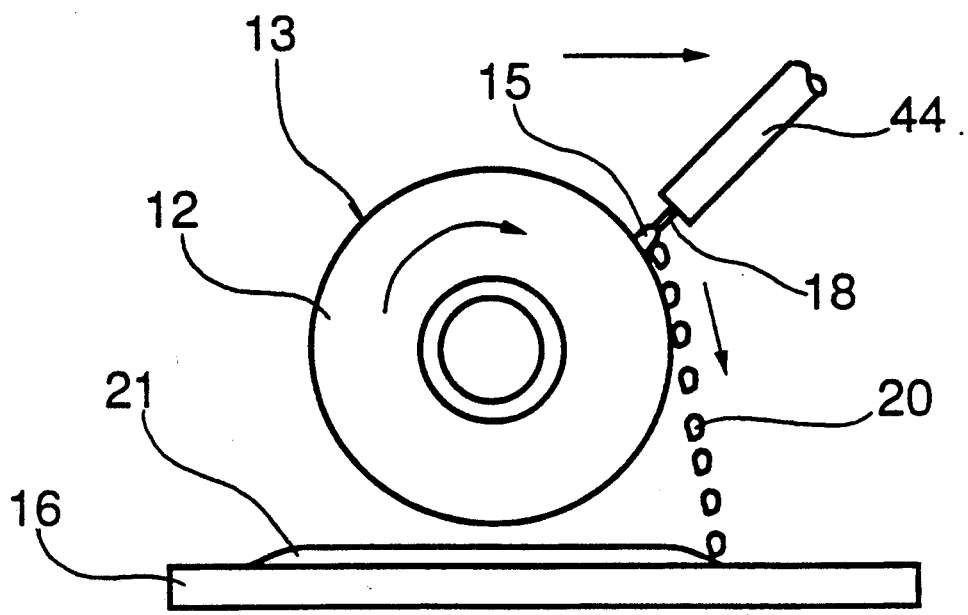
FIG. 7 is a side view of a portion of yet another embodiment of our apparatus for depositing molten metal.

In the embodiment of FIG. 7, the collector electrode 12 is turned sideways by 90 degrees, so that the axis of rotation is now horizontal, instead of vertical. As in the vertical version, the arc is established between the wire 18, which is fed through the torch 44, and the collector electrode. Droplets of molten metal will form at the end of the wire and then fall onto the collector electrode. The rotation of the collector electrode will accelerate the droplets in the direction of the substrate (shown by the arrow in FIG. 7). The droplets will hit the target with increased kinetic energy. Upon impact, the additional kinetic energy helps to break the skin, which forms on the surface of the droplets, and therefore flattens the deposit. This reduces or eliminates the tendency of the deposited metal to form deposits with undercuts between adjacent deposited droplets.

The weld torch nozzle 14 is fixed to the frame 36 so that the weld torch nozzle 14 is directed a fixed distance from the collector electrode 12. The welding power supply (not shown) has one pole connected to the torch 44 and the other pole connected to the electrode. Thus, when the welding power supply is activated, an electric welding current forms an arc 15 between the weld torch 5 and the collector electrode 12. The welding power supply preferably provides a constant or pulsed dc current. A supply of feed metal 18 is provided which is preferably fed from the weld torch 44. And although the feed metal 18 is preferably fed from within the weld torch 44, the feed metal 18 may be fed into the electric current arc from any location. We have found steel and copper to be suitable feed metals. The feed metal 18 then acts as an electrode and the welding current arc 15 travels between the feed metal 18 and the collector electrode 12. Since the weld torch 44 and the collector electrode 12 are located a selected distance from the substrate 16, the welding current arc 15 is located a selected distance from the substrate 16 as well. The distance of the weld torch 44 and the collector electrode 12 from the substrate 16 is selected so that the torch and electrode do not touch the substrate 16 or the metal already deposited on the substrate.

In the MIG version shown in FIG. 2, the wire 18 is fed through the torch 44 and consumed by being melted and deposited. In a TIG-like version shown in FIG. 8 the torch is equipped with a nonconsumable electrode, preferably a tungsten electrode 17. An arc 15 is established between the nonconsumable electrode 17 and the collector electrode 12. The wire 18 is fed through a separate feeding mechanism 45 which is located directly above the arc. The wire is melted by the arc, droplets will form at the end of the wire and fall down.

Figure 8:
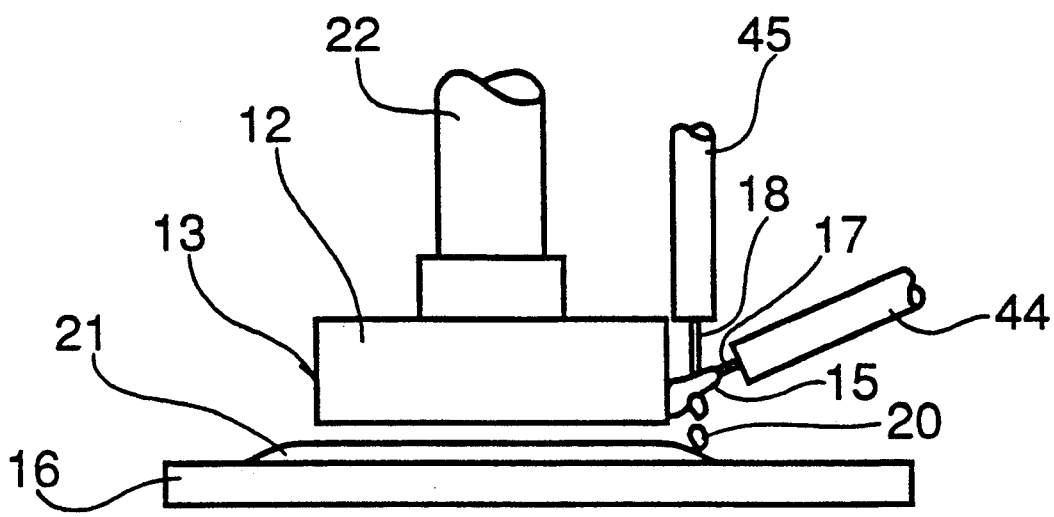
FIG. 8 is a side view of the apparatus shown in FIG. 3 with a wire feeded for tungsten inert gas (TIG)-like operation.

The embodiment of FIG. 8 has several benefits. The arc temperature can be chosen independently from the wire feed rate, therefore allowing one to independently control the temperature of the droplets and the amount of deposit. This makes it possible to control the heat input into the substrate or previously deposited layers by varying the rate of deposition. Positional accuracy of each droplet is important to guarantee a uniform deposit without voids. In the TIG-like version, the droplets fall straight down from the end of the wire, giving an increased positional accuracy compared to the version shown in FIG. 2. In the embodiment of FIG. 2 the location of the deposit depends upon the location where the wire is melted. This location changes with different arc parameters. Changes can also be caused by unstable arc conditions.

In operation, the motor 28 drives the rotating shaft 22 causing the collector electrode 12 to rotate. Coolant is circulated into and out of the coolant passage 24 of the collector electrode 12. A feed metal 18 is fed from weld torch 44. The power supply then energizes an electric welding current between the feed metal 18 and the rotating collector electrode 12. An arc 15 then forms between the feed metal 18 and the collector electrode 12. The welding current arc 15 melts the feed metal 18 into molten metal 20 at some point between the weld torch 44 and a side 13 of the collector electrode 12. In a preferred embodiment the molten metal forms between the torch and the collector electrode 12. The molten metal 20 then falls onto the substrate 16.

The feed metal 18 is melted by the arc 15. At the end of the feed metal 18 a droplet starts to form. Surface tension causes the droplet to hang from the end of the feed metal 18. If no additional mechanical energy is supplied, the size of the droplet increases, until the force caused by gravity is finally strong enough to break the surface tension, and the droplet falls towards the substrate. The size of the droplet depends mainly upon the amount of surface tension, which depends upon the temperature of the molten metal. The temperature of the droplet is mainly influenced by the parameters of the arc, which cannot be chosen freely in order to maintain stable operating conditions. Also, different droplet temperatures might have adverse affects on the deposit.

Figure 9:
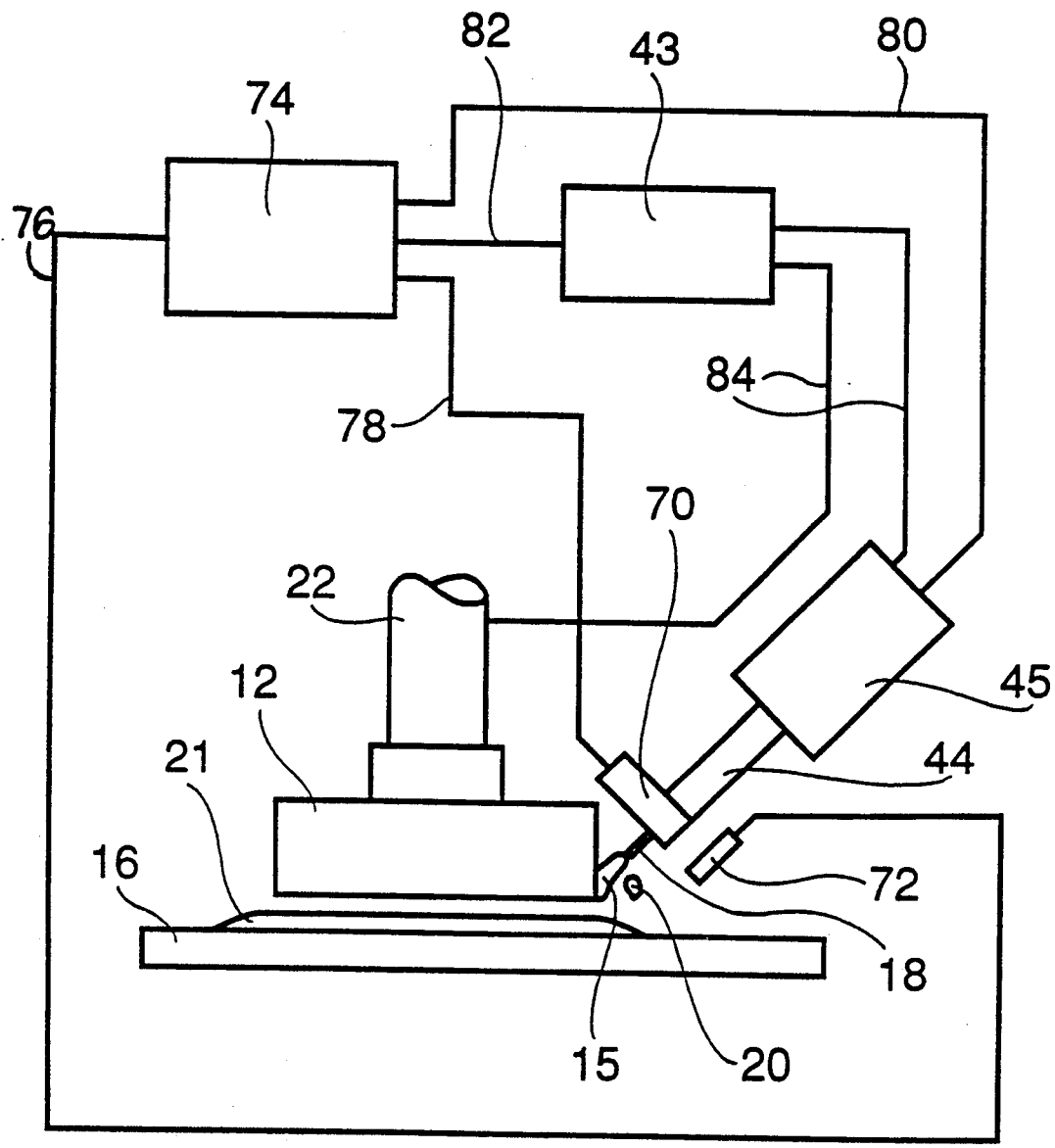
FIG. 9 is a diagram of a sixth preferred embodiment.

We can control the droplet size in a wide range and independent from the droplet temperature by adding a mechanism to apply additional mechanical energy to the feed metal. In the embodiment of FIG. 9, we make a controlled application of a mechanical force to the feed metal 18 or weld torch 44. Power supply 43 provides electricity through lines 84 to create an arc between the weld torch 44 and the electrode 12. A control computer 74 is connected to the wire feed 45, the welding power supply 43 and the mechanical actuator 70. A temperature sensor 72 measures the temperature of the deposited material and provides a feedback signal thru line 76 to the controller 74. According to the feedback signal the controller 74 adjusts the signal carried by line 80 for the wire feed 45 (to control the wire feed speed), the signals traveling line 82 for the welding power supply 43 (to adjust the parameters of the electric arc) and the signal passing on line 78 to the mechanical actuator 70 (to adjust the additional mechanical energy supplied to the feed wire). In this manner, optimal operating conditions can be reached. One way of applying the additional mechanical energy to the feed wire could be by constantly vibrating the feed metal 18. Another way could be by applying a short mechanical impulse to the wire 18 when the droplet reaches the desired size. The actual displacement of the feed metal can be rather small. Constant vibration of the wire 18 will cause the droplet at the end of the wire to vibrate constantly, a short mechanical impulse will cause the droplet at the end of the wire to vibrate a short period when the impulse is applied. The vibration of the droplet causes additional forces which help to break the surface tension which is holding the droplet to the wire. Vibration of the droplet causes the surface tension to be broken sooner, which allows the deposition of smaller sized droplets. The droplet size can be varied by varying the amplitude and/or the frequency of the constant vibration, or the amplitude of the short impulses and the interval at which the impulses are applied to the wire. The source of the additional mechanical energy could be any mechanical or electro-magnetic actuator, including ultrasonic and piezoelectric actuators. The mechanical energy could be transferred to the wire by a mechanical actuator integrated in the torch 44 for the versions shown in FIGS. 1 to 7, a mechanical actuator integrated in the wire feeder 45 for the version shown in FIG. 8, or by feeding the wire through a small hole in a piece extending from the mechanical actuator which is mounted externally as shown in FIG. 9. The piece extending from the actuator would preferably be located at the end of the torch 44 (i.e. the wire feeder 45 for the version shown in FIG. 8), a small distance away from the point where the wire hits the arc. If constant vibration is used, the vibration could also be transferred to the wire by vibrating the whole electrode and torch assembly. A vibrating device could be integrated into the torch 44 for the versions shown in FIGS. 1 to 7, or into the wire feeder 45 for the version shown in FIG. 8. One could also feed the wire through a small hole in a piece (not shown) extending from the vibration source. The piece extending from the transducer would preferably be located at the end of the torch 44, or the wire feeder 45 for the version shown in FIG. 8, a small distance away from the point where the wire hits the arc.

In our experiments we have seen that the rate at which the droplets cool down after they are deposited depends upon the surface upon which the droplets are deposited. Different materials and different geometric shapes result in different thermal properties, and therefore the deposited droplets cool down faster or slower. The rate at which the droplets cool down has a strong influence on the quality of the deposit. In order to get a uniform deposit of the desired shape, it is desirable to deposit the next droplet when the previous, already deposited droplet has cooled down to a certain temperature. To accomplish this, we prefer to provide a temperature sensor 72 as shown in FIG. 9 to measure the temperature of the previously deposited droplet. The rate at which the droplets are deposited would be adjusted according to the measured temperature by means of a control loop. That controller regulates the feed rate of the feed metal 18, the arc parameters and the velocity at which the collector electrode and the torch transverses over the substrate or previous layers.

Figure 3:
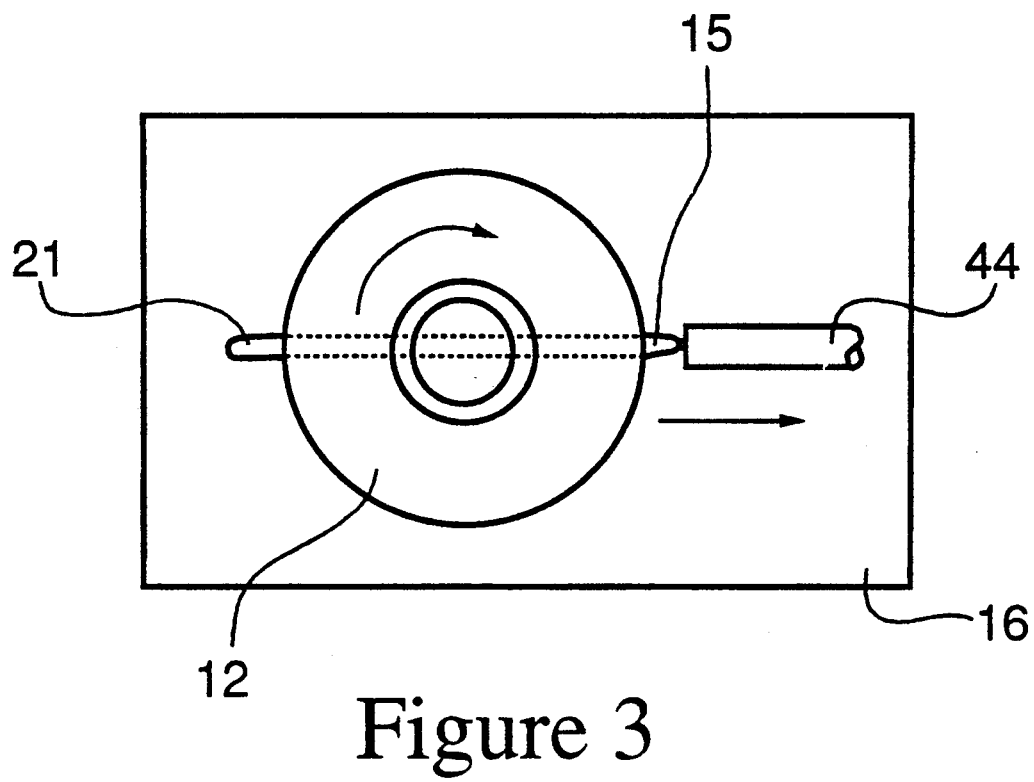
FIG. 3 is a top view of a portion of a second preferred apparatus for depositing molten metal which has no brush.
Figure 5:
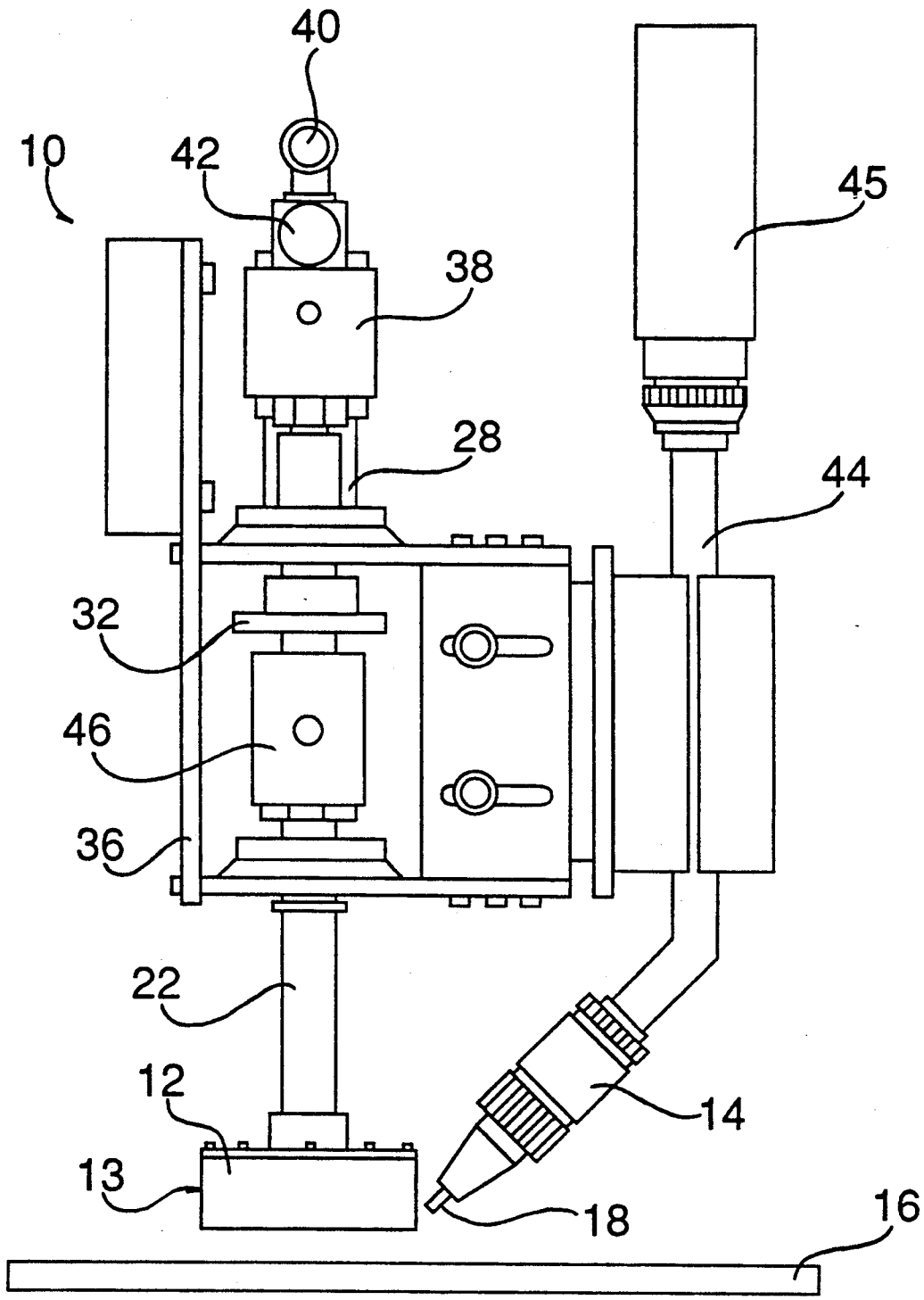
FIG. 5 is a side view of the preferred apparatus partially shown in FIG. 3 for depositing molten metal over a substrate.

The weld torch 14 and the collector electrode 12, which preferably do not move relative to one another, may be selectively moved as a unit as shown by the straight arrow of FIGS. 3 and 7. The collector electrode 12 and the weld torch 14 may be movable by being attached to a computer controlled positioning device such as a robot or a computer numerically controlled machine (CNC machine). Such machines are known in which sequential movements are programmed into the computer. Moving the weld torch 14 and the collector electrode 12 allows the deposited molten metal 20 to be placed at selected locations on substrate 16.

Heat is generated at the side 13 of collector electrode 12 by the welding current arc 15. The rotation of the collector electrode 12 causes different points along the side of collector electrode 12 to be in direct contact with the welding current arc 15. Thus, as no single point along the side 13 of collector electrode 12 bears direct contact of long duration with the welding current arc 15, excessive heat build up in a single spot in the collector electrode 12 is prevented. Also, the flow of coolant through the collector electrode 12 assists in the relieving of heat buildup in the collector electrode 12 by carrying excess heat out of the coolant passage 24 of collector electrode 12. Furthermore, fabricating the collector electrode 12 from copper helps in preventing excessive build up of heat on the collector electrode 12. This is because of the high electrical and thermal conductivity of copper.

Referring next to FIG. 4, an alternative embodiment of the apparatus is shown. In this embodiment, the collector electrode 48 has beveled sides 50. The welding current arc 15 will thus travel between the weld torch 14 and the beveled sides 50 of the collector electrode 12. Although the beveled sides 50 of collector electrode 48 are shown to be sloped downward and inward, the sides may be sloped downward and outward. Additionally, any angle of slope for the sides 50 may be selected.

Further variations of the preferred embodiments could be made. For example, the substrate 16 is preferably connected to the apparatus 10 for relative movement therebetween. However, the substrate 16 may be independent of apparatus 10 while cooperating with apparatus 10 in the weld deposition. Furthermore, it should be understood that the collector electrode 12 may be rotated, reciprocated, move linearly or have a pendulum motion at any selected rate or may not move at all. In the embodiment of FIG. 7 the electrode 12 is oriented to rotate in a plane which is normal to the substrate. Any ground connection can be used for a non-rotating electrode.

Although the weld torch 14 and the collector electrode 12 are preferably moved as a unit so as to selectively place molten metal on the substrate 16, the weld torch 14 and the collector electrode 12 may be held fixed while the substrate 16 is selectively moved.

Also, the collector electrode 12 is preferably cylindrical in shape. However, other shapes could be used particularly in an embodiment in which the collector electrode does not rotate. Furthermore, although the collector electrode is preferably made of copper, any conductive material may be used.

The inner coolant channel 26 and the outer coolant channel 27 are preferably coaxial. However, they may simply be adjacent pipes. And, although a coolant pump is preferably mounted exterior to the apparatus, the apparatus could be equipped with its own integral coolant pump. Further, although a coolant system is preferred, the present method and apparatus may be practiced without such coolant system.

While certain present preferred embodiments have been shown and described, it is distinctly understood that the invention is not limited thereto but may be otherwise embodied within the scope of the following claims.

We claim:

1. An apparatus for depositing molten metal to form a three-dimensional object, comprising:
    a rotatable collector electrode located a selected distance above a work surface;
    a weld torch located a selected distance from the collector electrode, wherein an electric welding current travels between the collector electrode and the weld torch, the relative position of the welding current to the collector electrode and the weld torch remaining fixed; and
    means for feeding a feed metal into the welding current so that the welding current can melt the feed metal into molten metal and transfer the molten metal towards the collector electrode so that the molten metal is deposited onto the work surface below the collector electrode to form a three-dimensional object.

2. The apparatus of claim 1 wherein the welding current between the weld torch and the collector electrode does not penetrate the work surface.

3. The apparatus of claim 1 further comprising a passage located within the collector electrode for a coolant to pass therethrough.

4. The apparatus of claim 1 wherein the collector electrode is made of one of copper and a copper alloy.

5. The apparatus of claim 1 wherein one of the collector electrode and the work surface are movable in at least one direction.

6. The apparatus of claim 1 wherein the collector electrode and the weld torch and the work surface are mounted to a computer numerically controlled machine.

7. The apparatus of claim 1 wherein the work surface is comprised of a nonconductive material.

8. The apparatus of claim 1 wherein the work surface is comprised of a conductive material.

9. The apparatus of claim 1 wherein the weld torch and the collector electrode are positioned above the work surface during the depositing operation.

10. The apparatus of claim 1 wherein the work surface and the feed metal are comprised of dissimilar materials.

11. The apparatus of claim 1 also comprising means for applying mechanical energy to the feed metal.

12. The apparatus of claim 11 wherein the means for applying mechanical energy causes the feed metal to vibrate.

13. An apparatus for depositing molten metal to form a three-dimensional object, comprising:
- a collector electrode located a selected distance above a work surface;
- a weld torch located a selected distance from the collector electrode, wherein an electric welding current travels between the collector electrode and the weld torch, the relative position of the welding current to the collector electrode and the weld torch remaining fixed;
- means for feeding a feed metal into the welding current so that the welding current can melt the feed metal into molten metal and transfer the molten metal towards the collector electrode so that the molten metal is deposited onto the work surface below the collector electrode to form a three-dimensional object; and
- a cleaning brush that is in contact with the collector electrode.

14. A method for depositing molten metal to form a three-dimensional object, comprising:
- positioning a collector electrode a selected distance above a work surface;
- positioning a weld torch a selected distance from the collector electrode, wherein an electric welding current travels between the collector electrode and the weld torch;
- placing sufficient feed metal into the welding current so that the welding current can melt the feed metal into molten metal adjacent the collector electrode which molten metal is deposited onto the work surface below the collector electrode to form a three-dimensional object consisting of a plurality of deposited layers of feed metal; and
- removing the three-dimensional object from the work surface.

15. The method of claim 14 wherein a passage is located within the collector electrode for a coolant to pass therethrough.

16. The method of claim 14 further comprising the step of rotating said collector electrode.

17. The method of claim 14 wherein the collector electrode is made of one of copper and copper alloy.

18. The method of claim 14 further comprising the step of selectively moving one of the collector electrode and the work surface during the depositing of the molten metal so that the molten metal will be released onto selected locations of the work surface and metal deposited thereon.

19. The method of claim 14 wherein the work surface is comprised of a nonconductive material.

20. The method of claim 14 wherein the work surface is comprised of a conductive material.

21. The method of claim 14 wherein the weld torch and the collector electrode are positioned above the work surface during the depositing operation.

22. The method of claim 14 wherein the weld torch and the collector electrode and the work surface are mounted to a computer numerically controlled machine.

23. The method of claim 14 wherein the work surface and the feed metal are composed of dissimilar materials.

24. The method of claim 14 also comprising the step of applying mechanical energy to the feed metal.

25. The method of claim 24 wherein applying mechanical energy causes the feed metal to vibrate.

26. The method of claim 14 also comprising the steps of:
a) measuring a temperature of at least one droplet of deposited metal; and
b) adjusting a rate at which subsequent droplets are deposited based upon a measured temperature.

27. An apparatus for depositing molten metal onto a work surface to form a three-dimensional object thereon, comprising:
- a collector electrode located a selected distance above the work surface, the collector electrode being rotatable about an axis, the axis of rotation being generally parallel with the work surface;
- a weld torch located a selected distance above the collector electrode, wherein an electric welding current travels between the collector electrode and the weld torch, the relative position of the welding current to the collector electrode and the weld torch remaining fixed; and
- means for feeding a feed metal into the welding current so that the welding current can melt the feed metal into molten metal and transfer the molten metal onto the collector electrode, wherein the molten metal then drops onto the work surface ad the molten metal's drop from the collector electrode onto the work surface is accelerated by the centrifugal force at the rotating collector electrode.

28. A method for depositing molten metal onto a work surface to form a three-dimensional object, comprising:
- providing a collector electrode a selected distance above the work surface, the collector electrode being rotatable about an axis, the axis of rotation being generally parallel with the work surface;
- providing a weld torch a selected distance above the collector electrode, wherein an electric welding current travels between the collector electrode and the weld torch, the relative position of the welding current to the collector electrode and the weld torch remaining fixed; and
- feeding sufficient feed metal into the welding current so that the welding current can melt the feed metal into molten metal and transfer the molten metal onto the collector electrode, wherein the molten metal then drops onto the work surface to form a three-dimensional object and the molten metal's drop from the collector electrode onto the work surface is accelerated by centrifugal force at the rotating collector electrode.

29. A method for depositing molten metal to form a three-dimensional object, comprising:
- positioning a first electrode a selected distance above a work surface;

positioning a second electrode a selected distance from the first electrode, wherein an electric welding current travels between the electrodes and above the work surface;

placing sufficient feed metal into the welding current so that the welding current can melt the feed metal into discrete molten metal droplets adjacent the first electrode which molten metal is dropped onto the work surface below the first electrode to form a three-dimensional object comprised of a plurality of incremental layers; and removing the three-dimensional object from the work surface.

* * * * *